US010144443B2

(12) United States Patent
Carbonaro

(10) Patent No.: US 10,144,443 B2
(45) Date of Patent: Dec. 4, 2018

(54) TRANSPORTATION DEVICE

(71) Applicant: James Carbonaro, Cocoa, FL (US)

(72) Inventor: James Carbonaro, Cocoa, FL (US)

(*) Notice: Subject to any disclaimer, the term of this patent is extended or adjusted under 35 U.S.C. 154(b) by 0 days.

(21) Appl. No.: 15/490,341

(22) Filed: Apr. 18, 2017

(65) Prior Publication Data

US 2017/0297601 A1 Oct. 19, 2017

Related U.S. Application Data

(60) Provisional application No. 62/323,850, filed on Apr. 18, 2016.

(51) Int. Cl.
*B62B 1/00* (2006.01)
*B62B 9/12* (2006.01)
*B62B 7/02* (2006.01)
*B62B 9/10* (2006.01)
*B62B 9/24* (2006.01)

(52) U.S. Cl.
CPC .............. *B62B 9/12* (2013.01); *B62B 7/02* (2013.01); *B62B 9/102* (2013.01); *B62B 9/24* (2013.01)

(58) Field of Classification Search
CPC .. B62B 9/12; B62B 9/24; B62B 9/102; B62B 9/14; B62B 9/18; B62B 7/02; B62B 7/145; B62B 7/08; B62B 7/06; B62B 7/00; B62B 1/04; B62B 1/008; B62B 1/10; B62B 1/12; B62B 1/16; B62B 5/08; B62B 5/082; B62B 5/0013; B62B 5/087
See application file for complete search history.

(56) References Cited

U.S. PATENT DOCUMENTS

| 1,524,958 | A | * | 2/1925 | Transue | B62B 7/02 280/37 |
| 2,181,892 | A | * | 12/1939 | Head | B62B 1/12 280/14 |
| 2,393,020 | A | * | 1/1946 | Brede | B62B 1/10 280/14 |
| 2,661,959 | A | * | 12/1953 | Bell | B62B 7/02 188/20 |
| 2,712,451 | A |   | 7/1955 | Welsh | |
| 4,765,646 | A | * | 8/1988 | Cheng | B62B 3/022 280/651 |
| 5,090,724 | A | * | 2/1992 | Fiore | B62B 5/082 280/47.38 |
| 5,125,674 | A | * | 6/1992 | Manuszak | B62B 7/12 280/30 |
| 5,294,158 | A | * | 3/1994 | Cheng | B62B 3/02 280/641 |
| 5,899,467 | A | * | 5/1999 | Henkel | A45C 5/14 190/1 |
| 6,378,891 | B1| * | 4/2002 | Maher | B62B 3/027 280/644 |

(Continued)

*Primary Examiner* — James M Dolak

(57) ABSTRACT

A device for transporting children. The transportation device includes a base and sidewalls extending therefrom, forming an interior volume. Wheels extend from a lower side of the base and a foldable seat is affixed to at least one sidewall. A pair of doors are hingedly attached to opposing sidewalls, which allow a child ingress and egress from the transportation device. The folding seat allows the transportation device to include an increased capacity to hold objects when not in use by the child.

17 Claims, 4 Drawing Sheets

(56) References Cited

U.S. PATENT DOCUMENTS

| | | | | |
|---|---|---|---|---|
| 6,663,074 B2* | 12/2003 | Prior | .................. | A47B 85/00 |
| | | | | 108/167 |
| 6,869,097 B2* | 3/2005 | Prather | .................. | B62B 3/027 |
| | | | | 280/33.996 |
| 7,354,049 B2* | 4/2008 | Schmidt | .................. | A45C 9/00 |
| | | | | 280/33.993 |
| 7,775,548 B2 | 8/2010 | McIntyre et al. | | |
| 8,109,477 B1* | 2/2012 | Blasbalg | .................. | B65F 1/004 |
| | | | | 248/101 |
| 8,505,957 B2 | 8/2013 | Bizzell et al. | | |
| 8,807,588 B2 | 8/2014 | Thomas et al. | | |
| 9,540,024 B2* | 1/2017 | Iryami | .................. | B62B 3/027 |
| 9,796,402 B1* | 10/2017 | Suarez | .................. | B62B 5/0053 |
| 9,826,711 B1* | 11/2017 | Evans | .................. | A01K 1/0245 |
| 9,834,239 B2* | 12/2017 | Newton | .................. | B62B 7/006 |
| 9,937,945 B1* | 4/2018 | Phillips | .................. | B62B 7/004 |
| 9,937,946 B1* | 4/2018 | Gillis | .................. | B62B 9/12 |
| 9,950,729 B2* | 4/2018 | Choi | .................. | B62B 7/06 |
| 9,956,981 B1* | 5/2018 | Fitzwater | .................. | B62B 9/142 |
| 2013/0087993 A1* | 4/2013 | Jacquet | .................. | A47D 1/004 |
| | | | | 280/647 |

* cited by examiner

TRANSPORTATION DEVICE

CROSS REFERENCE TO RELATED APPLICATIONS

This application claims the benefit of U.S. Provisional Application No. 62/323,850 filed on Apr. 18, 2016. The above identified patent application is herein incorporated by reference in its entirety to provide continuity of disclosure.

BACKGROUND OF THE INVENTION

The present invention relates to transportation devices. Many individuals utilize child transportation devices such as strollers to safely and easily transport a child. Most strollers position a child in a seated position. However, this position can be uncomfortable if maintained over time and may lead to a child becoming irritable. Further, the seated position prevents children from observing their surroundings. This leads to additional irritability when a child wants to perceive their environment but cannot do so comfortably. Additionally, conventional strollers are bulky and difficult to maneuver through crowded areas.

It is physically difficult, painful, and potentially injurious to lift a larger or older child into a stroller. Furthermore, if the stroller is being used for all-day activities, such as visiting an amusement park or watching a parade, the child may want to repeatedly get in and out of the stroller to alleviate fatigue, but in so doing exacerbating the problems of their caretaker. Further, some children are too large to fit in a stroller. These children can become tired and irritable from prolonged periods of walking or standing. Therefore, there exists a need for a device that transports children and can be conveniently stored.

SUMMARY OF THE INVENTION

It is therefore an object of the present invention to provide a new and improved transportation device that has all the advantages of the prior art and none of the disadvantages. The embodiments of the present invention described below are not intended to be exhaustive or to limit the invention to the precise forms disclosed in the following detailed descriptions. Rather, the embodiments are chosen and described so that others skilled in the art may appreciate and understand the principles and practices of the present invention.

In view of the foregoing disadvantages inherent in the known types of transportation devices now present in the prior art, the present invention provides in one embodiment a foldable transportation device with entry doors configured to support a child in a raised standing position or an upright seated position. The transportation device includes a base and sidewalls extending therefrom, which form an interior volume. Wheels extend from a lower end of the base and a foldable seat is affixed to at least one sidewall. A pair of doors are pivotally attached to opposing sidewalls, which allow a child ingress into the transportation device and easy egress from the transportation device. The folding seat allows the transportation device to provide more capacity to hold property when not in use by a child.

BRIEF DESCRIPTION OF THE DRAWINGS

Although the characteristic features of this invention will be particularly pointed out in the claims, the invention itself and methods in which it may be made and used may be better understood after a review of the following description, taken in conjunction with the accompanying drawings wherein like numeral annotations are provided throughout.

DETAILED DESCRIPTION OF THE INVENTION

Figure 1:
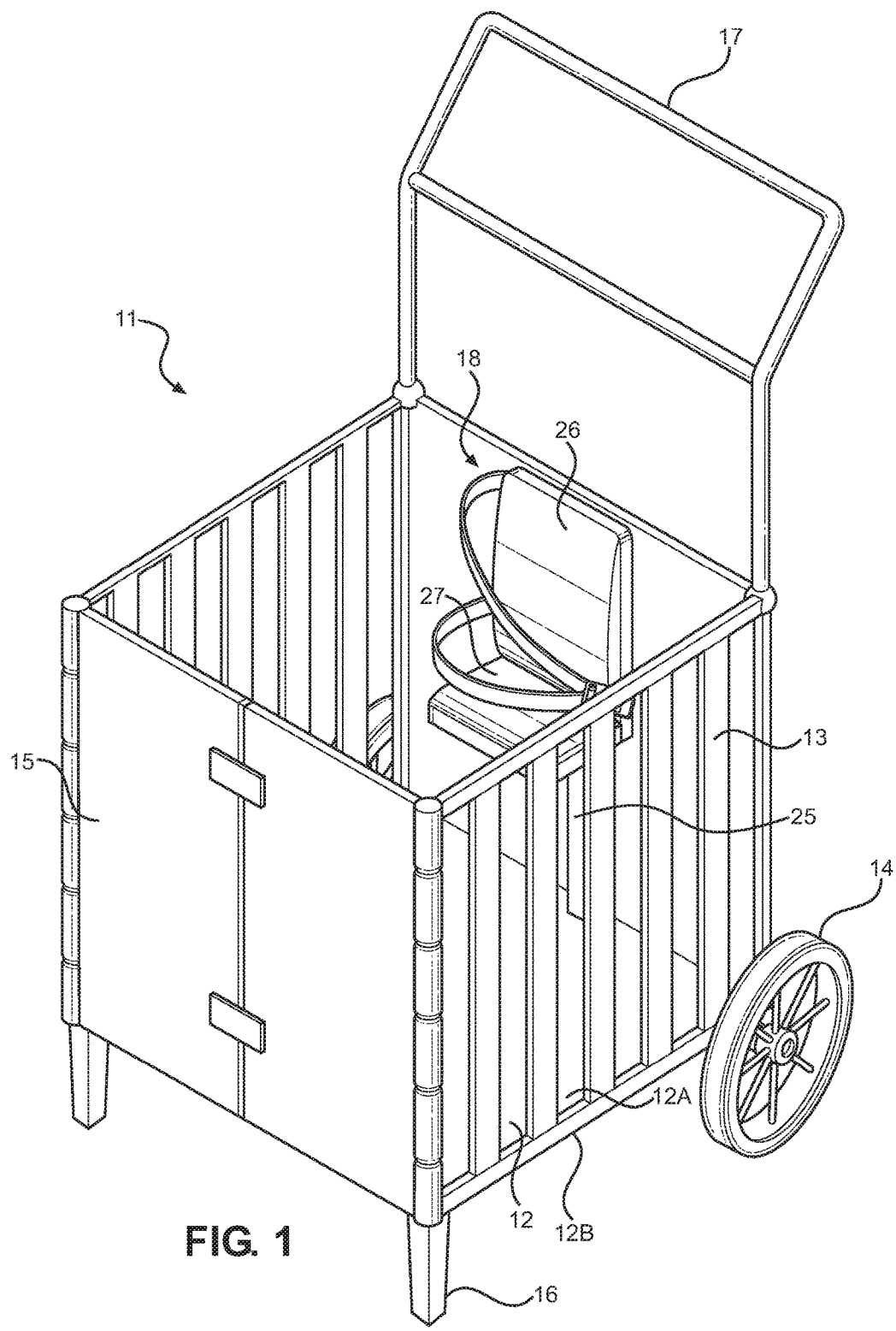
FIG. 1 shows a perspective view of a first embodiment of the transportation device in its extended use position.

Reference is made herein to the attached drawings. Like reference numerals are used throughout the drawings to depict like or similar elements of the transportation device. The figures are intended for representative purposes only and should not be considered to be limiting in any respect. Aspects directed to specific embodiments of the invention are disclosed in the following description and related drawings. Alternate embodiments may be devised without departing from the spirit or the scope of the invention. Additionally, well-known elements of embodiments of the invention will not be described in detail or will be omitted so as not to obscure the relevant details of the invention. Further, to facilitate an understanding of the description, an explanation of several terms used herein follows.

Figure 3:
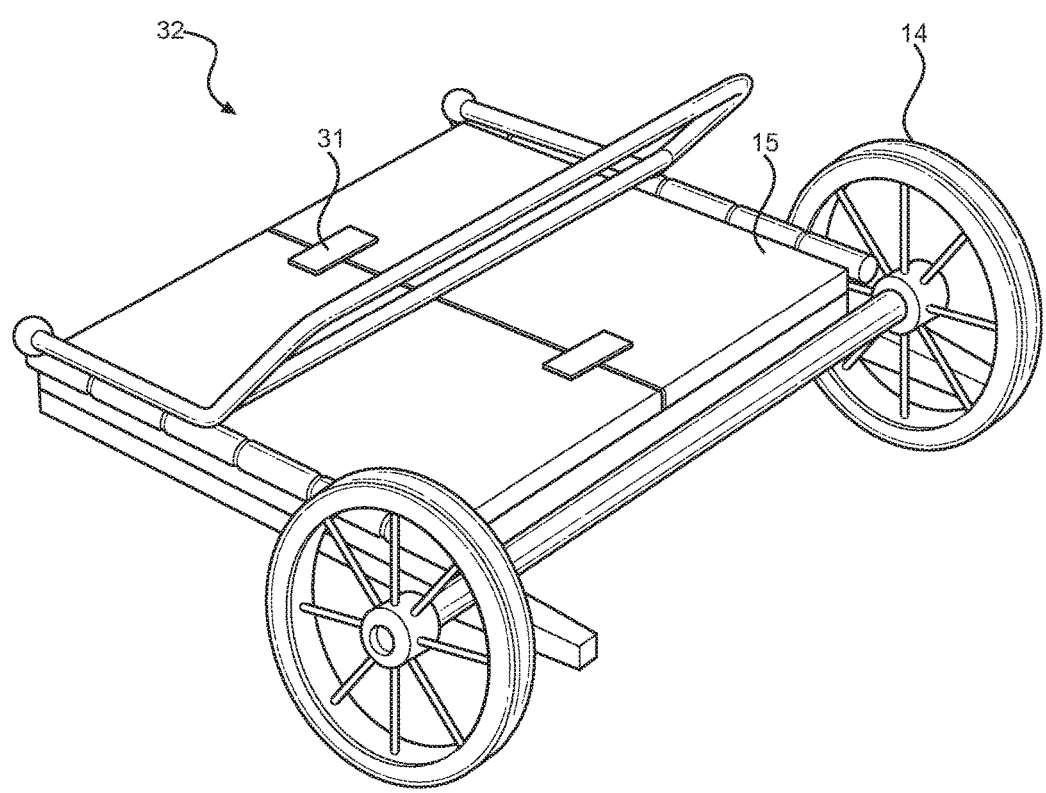
FIG. 3 shows a perspective view of a first embodiment of the transportation device in its folded use position.

Referring now FIG. 1, there is shown a perspective view of a first embodiment of the transportation device in its extended use position. The transportation device 11 includes a base 12 and at least one sidewall 13 extending vertically therefrom, so as to completely surround a seated individual and form an interior volume adapted to receive a child therein. The base 12 comprises an upper side 12A and a lower side 12B with a roller fastened to the lower side 12B of the base 14. The transportation device 11 further includes a foldable seat 18 fastened to a sidewall 13, and a pair of doors 15 pivotally attached to a sidewall 13. This embodiment further includes support legs 16 fastened to the lower side 12B of the base 12, and a handle 17 fastened to a sidewall 13. In this embodiment, the seat 18 is fastened to the same sidewall 13 that the handle 17 is fastened to and opposite them is the pair of doors 15, furthermore in this embodiment, the transportation device 11 is foldable, as shown in FIG. 3. As this invention has a multitude of purposes and may be adapted to meet specific needs, it is foreseeable that other shapes, materials, or adaptations obvious to those skilled in the art may be used to optimize efficiency for a particular task or environment.

The base 12 is substantially planar in this embodiment and is adapted to allow a child a stable and easy surface to stand and walk on. In one embodiment, the base 12 is rectangular and built of a single solid piece of material, such as wood, plastic, or metal. However, in alternative embodiments, the base 12 can be configured in any suitable way that a child can be supported thereon. For example, in one embodiment, the base 12 may be upholstered, painted, printed upon, cushioned, made of a mesh material, bars of a material, or other possibilities.

In the illustrated embodiment, the transportation device 11 includes three sidewalls 13, each extending vertically upwards relative to the upper side 12A of the base 12. The three sidewalls 13 each include a rectangular shape and are built of a material such as wood, plastic, or metal. However, in alternative embodiments, the sidewalls 13 may be adapted in any manner which would continue to enable a foldable seat 18 to be attached to at least one sidewall 13. For example, in an alternative embodiment of the transportation device 11, the sidewalls 13 may be upholstered, painted, printed upon, cushioned, made of a mesh material, bars of a material, extend at an obtuse angle in relation to the base, or other possibilities.

Figure 4:
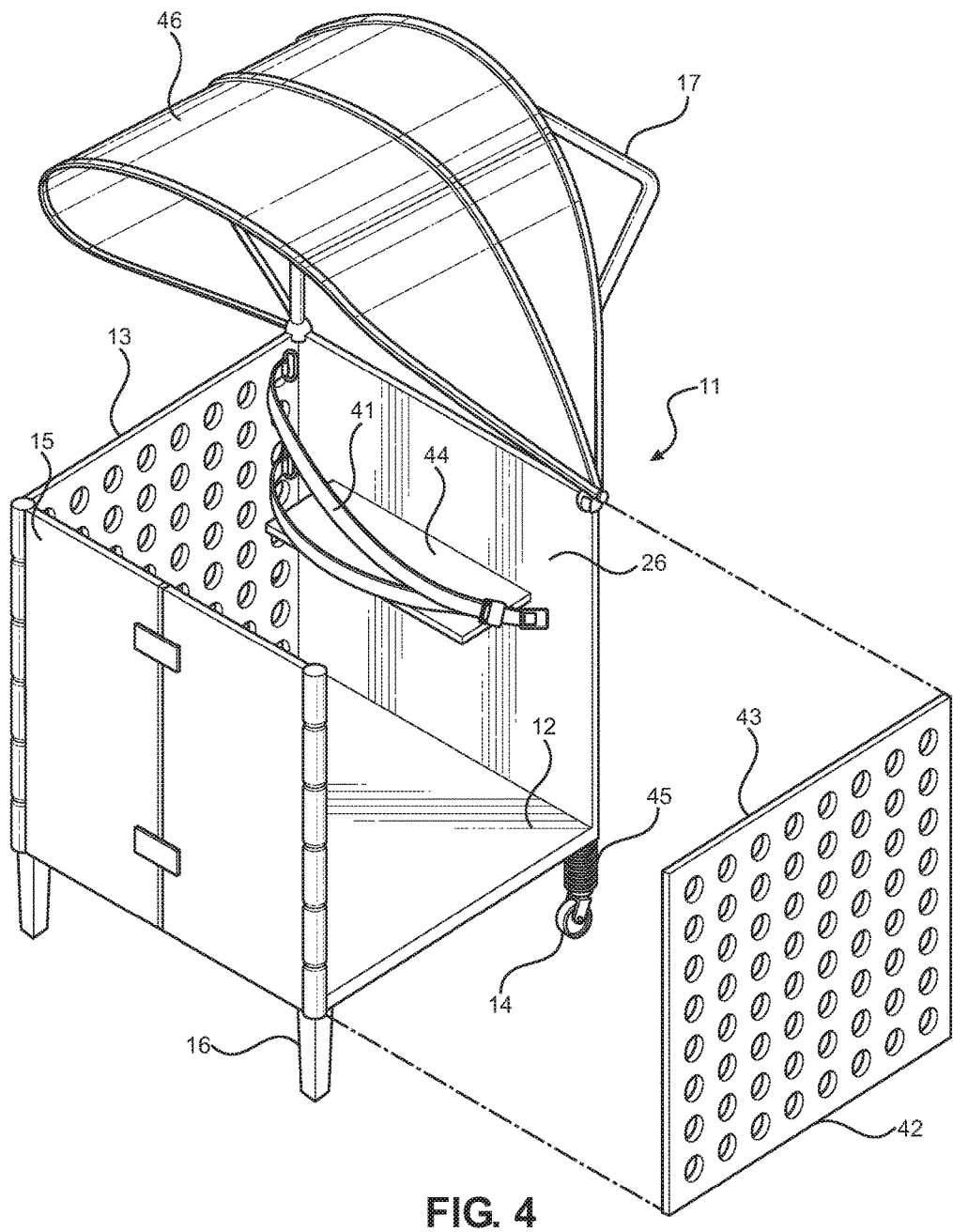
FIG. 4 shows a perspective view of a second embodiment of the transportation device in its extended use position.

The transportation device 11 further comprises rollers 14, wherein each roller 14 is fastened to the lower side 12B of the base 12. In the illustrated embodiment, the device comprises a pair of rollers 14 substantially positioned at and functionally affixed to the corners of the lower side 12B of the base 12 beneath the sidewall 13 that the foldable seat 18 is affixed to. In one embodiment, the rollers 14 further have a shock absorber 45 functionally affixed to them, as shown in FIG. 4. The purpose of the shock absorber 45 is to make a safer more comfortable ride for any occupants of the transportation device 11. In embodiments of the transportation device 11, the rollers 14 may be castor wheels, ball casters, treads, wheels on an axle, have brakes which can lock in the braked position, be positioned at all four corners, or other possibilities.

In one embodiment, the transportation device 11 further includes a pair of support legs 16, which are substantially positioned at and affixed to the remaining two corners of the lower side 12B of the base 12. In this embodiment, the support legs 16 are hyperrectangular with the wide end affixed to the base 12 and the tapered end resting upon the ground. These support legs 16 are adapted to prevent slippage or movement on a variety of surfaces in a variety of weather conditions. In an alternative embodiment, the transportation device 11 may include no support legs, only one support leg, may include a plurality of support legs, or may include hard rubber circular leg tips, or be conically shaped.

The transportation device 11 further comprises a handle 17 affixed to a sidewall. In the illustrated embodiment, the handle 17 is an elongated metal bar fastened to the sidewall 13 where the foldable seat 18 is affixed by metal prongs. This handle 17 is adapted to allow the caretaker to press down on the bar causing it to act as a lever and thereby lifting the front legs 16 and resting the device entirely on the rear wheels 14, which act as a fulcrum. The transportation device 11 may then be easily pushed or pulled about. The handle may be made of various materials, have a textured plastic covering, come in various shapes and designs, or not be present at all.

In one embodiment of the transportation device 11, the pair of doors 15 are pivotally attached to ends of a pair of opposing sidewalls 13. The pair of doors 15 are configured to pivot radially inwardly relative to the interior volume to provide ingress into the transportation device 11 and pivot radially outwardly relative to the interior volume to provide egress from the transportation device 11. The pair of doors 15 form a sidewall 13 when in a closed position, such that the pair of doors 15 are parallel with the sidewall 13 on which the foldable seat 18 is fastened. In an alternative embodiment of this transportation device 11, the pair of doors 15 may be thematically shaped as "western" saloon doors, or there may be only one door, or other possibilities. A locking mechanism 31 is positioned on the exterior of the doors in order to prevent children from opening the doors while inside the transportation device, as shown in FIG. 3. In one embodiment, the locking mechanism 31 includes a latch. However, in alternate embodiments, the locking mechanism 31 can be any suitable type of locking mechanism that prevents doors from opening, such as a slide bolt.

Figure 2:
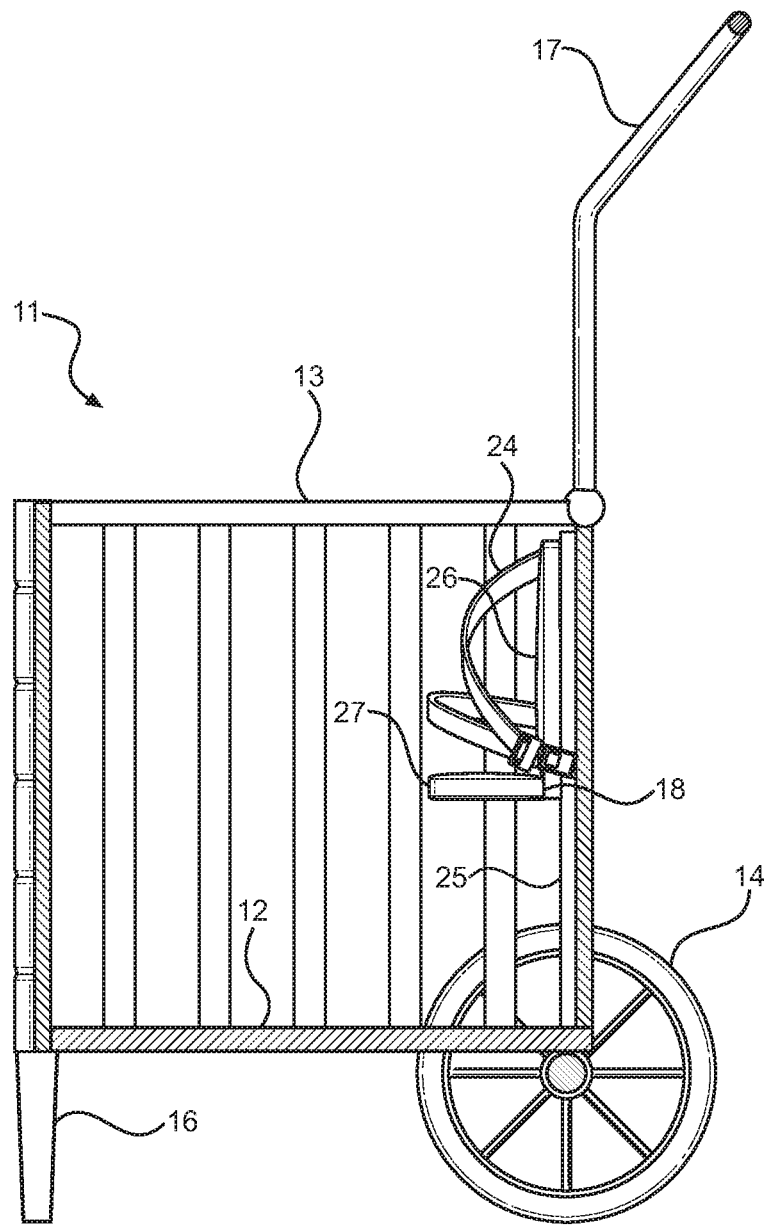
FIG. 2 shows a cross-sectional view of a first embodiment of the transportation device in its extended use position.

Referring now to FIG. 2, there is shown a cutaway view of the first embodiment of the transportation device in its extended use position. The foldable seat 18 is fastened to a sidewall 13, and is positioned parallel to the base 12 when in an unfolded position and perpendicular to the base 12 when in a folded position. The foldable seat 18 is configured to support and sustain a child thereon. In one embodiment, the seat 18 comprises a back half 26 pivotally affixed to a fold down seat half 27. The back half 26 is affixed to a rail and ratchet system 25 which allows for manually configurable elevation. The rail and ratchet system 25 in turn is attached to the sidewall 13 and the fold down seat 18 pivots between the folded and unfolded positions.

The height and depth of the foldable seat 18 are sized and dimensioned for providing comfort to children within the target demographic of the present invention. In one embodiment, the target demographic includes children three years of age. Further, the foldable seat 18 is configured to leave enough space for a child to stand comfortably even when another child is using the foldable seat 18. As it may be desirable to adjust seat height over time in this embodiment the foldable seat 18 has a manually configurable elevation which may be accomplished by any means apparent to one of ordinary skill in the art, but is done so here via a rail and ratchet system 25. In alternative embodiments, the foldable seat 18 may fold down directly from the sidewall 13 without a back half 26. As this invention has a multitude of purposes and may be adapted to meet specific needs it is foreseeable that in an alternative embodiment of the transportation device 11, the foldable seat 18 may be a fold down upholstered bucket seat with a head rest, may be a foldable seat 18 with a rail and ratchet system 25, as shown in FIG. 2, or may be made to seat more than one individual, such as a bench seat 44, as shown in FIG. 4. In other embodiments of this invention, multiple fold down seats 18 may be affixed to one or more sidewalls 13.

Referring now to FIG. 4, there is a shown a perspective view of a second embodiment of the transportation device in its extended use position. In one embodiment, the transportation device 11 includes a covering 46 affixed to one or more sidewalls 13. The covering 46 may be made of various materials, come in various designs, and be functionally affixed by any appropriate fastener to one or more sidewalls 13. The covering 46 is adapted to protect occupants from adverse weather conditions such as rain, snow, intense sunshine, or other such adverse conditions by extending past the sidewalls when fully extended and being collapsible upon itself in an accordion like fashion. Alternative embodiments of the device could have coverings with different intended purposes or have no coverings whatsoever. Other coverings could be composed of different materials, or be affixed in different ways.

In some embodiments, an adjustable securable safety harness 24 is fastened to the foldable seat 18 in order to a secure a child in the foldable seat 18, as shown in FIG. 1. There are many types of safety harnesses, fasteners, and adjustment systems which may be implemented. Other embodiments may have no safety harness 24 or may have a safety harness 41 that is fastened to a sidewall 13, as shown in FIG. 4. Other possibilities, modifications, and alterations will be obvious to those skilled in the art or science.

In one embodiment, the transportation device 11 includes a sidewall 42 that is removably affixed to the base 12 via slots in the base and slots in the sidewalls. Alternative ways to removably secure a sidewall 42 to the base 12 other than a slot system will be apparent to those of ordinary skill in the art. Further, the sidewall 42 comprises one or more openings 43 to allow for better airflow and perception of the surrounding environment. In one embodiment, the openings 43 would be circular and evenly spaced in rows, and columns, and include a diameter sized to prevent a child from sticking their fingers, hands, toes, feet or head therethrough. In another embodiment, sidewall 42 may be replaced with a different sidewall that is better suited for the child's new age and/or aesthetic preferences of the caretakers or child.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A transportation device, comprising:
   a base and a plurality of sidewalls disposed about a perimeter edge of the base, the sidewalls defining an interior volume;
   wherein each sidewall of the plurality of sidewalls is individually removably affixed to the base;
   the base including an upper side and a lower side;
   a roller affixed to the lower side;
   a seat disposed within the interior volume, the seat pivotally affixed to one of the plurality of sidewalls;
   the seat movable between a folded position and an unfolded position;
   wherein in the unfolded position the seat is rotated away from the sidewall and the seat supports a seated user thereon;
   wherein in the folded position the seat is rotated towards the sidewall and the upper side of the base supports a standing user thereon;
   a door pivotally affixed to one of the plurality of sidewalls, the door providing access to the interior volume.

2. The transportation device of claim 1, further comprising a shock absorber affixed to the roller.

3. The transportation device of claim 1, further comprising a covering removably affixed to one of the plurality of sidewalls.

4. The transportation device of claim 1, further comprising a handle affixed to one of the plurality of sidewalls.

5. The transportation device of claim 1, further comprising an adjustable securable safety harness fastened to the seat.

6. The transportation device of claim 1, further comprising an adjustable securable safety harness fastened to one of the plurality of sidewalls.

7. The transportation device of claim 1, further comprising a rail and ratchet system for the adjustment of elevation of the seat.

8. The transportation device of claim 1, wherein the transportation device has a folded position to minimize the volume of space taken by the transportation device during transportation of the transportation device and an extended use position to allow usage of the transportation device.

9. The transportation device of claim 1, wherein a sidewall includes an opening.

10. The transportation device of claim 1, wherein the door includes a locking mechanism.

11. The transportation device of claim 1, further comprising a support leg fastened to the lower side.

12. The transportation device of claim 1, wherein the seat is sized and dimensioned to receive more than one individual.

13. The transportation device of claim 1, wherein the sidewalls extend perpendicularly from the base so as to completely encompass a seated individual.

14. The transportation device of claim 1, wherein the roller is affixed to a corner of the lower side beneath a sidewall of the plurality of sidewalls that the seat is affixed to.

15. The transportation device of claim 1, wherein a support leg is affixed to a corner of the lower side beneath a sidewall of the plurality of sidewalls that is parallel to a sidewall of the plurality of sidewalls that the seat is affixed to.

16. The transportation device of claim 4, wherein the roller is comprised of a plurality of rollers wherein the plurality of rollers are affixed to the corners of the lower side beneath a sidewall of the plurality of sidewalls that the seat is affixed to;
   wherein a leg is affixed to the opposite end of the lower side;
   wherein the handle act as a lever when pressed down upon, whereby the lever lifts the portion of the lower side where the leg is affixed, while the rollers act as a fulcrum.

17. The transportation device of claim 1, wherein the plurality of sidewalls consists of three sidewalls and the door.

* * * * *